No. 620,600. Patented Mar. 7, 1899.
G. E. MASON.
TENT.
(Application filed Aug. 15, 1898.)
(No Model.)
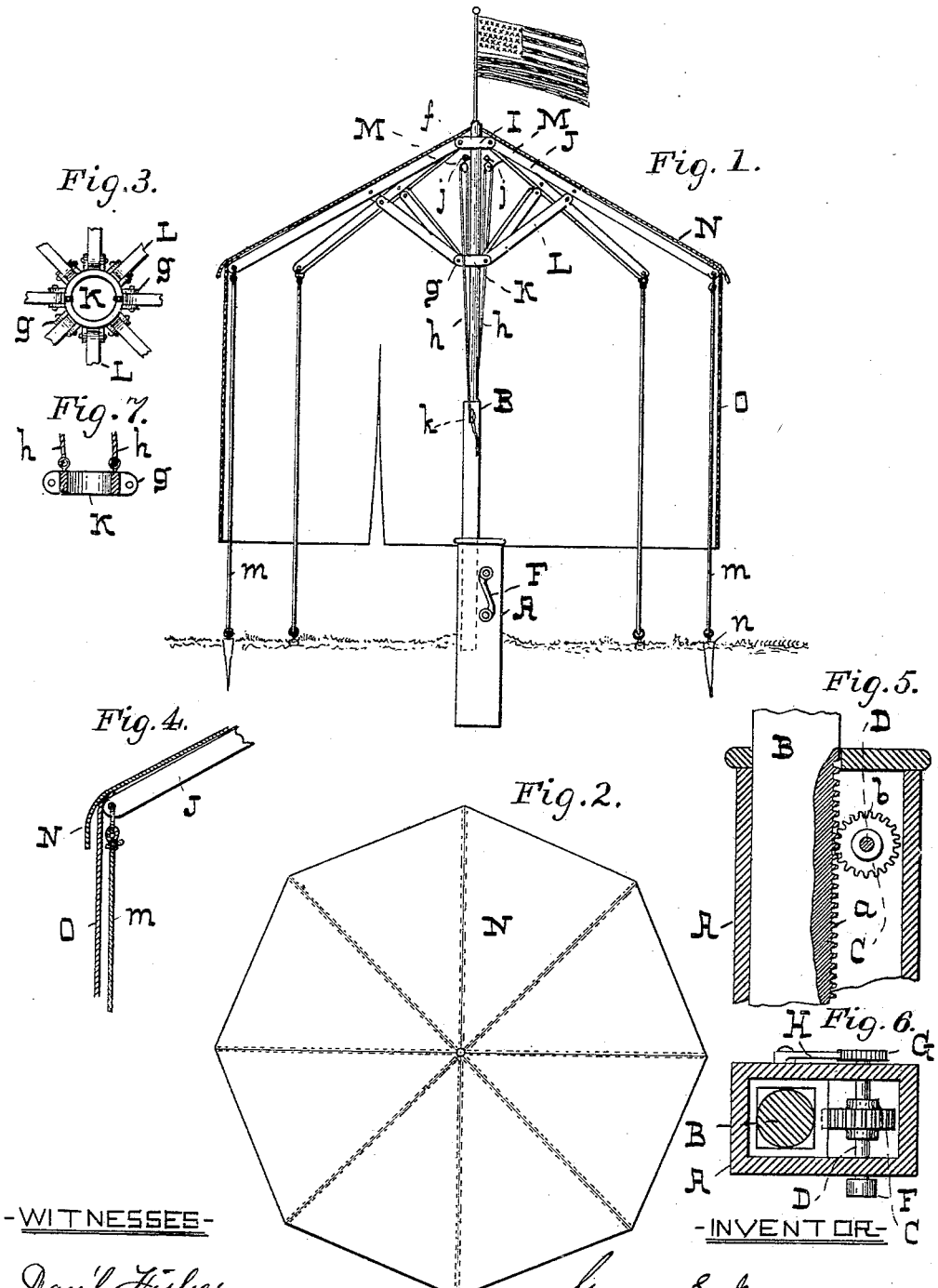
WITNESSES
Dan'l Fisher
H. Constantine
INVENTOR
George E. Mason,
by Geo. W. T. Howard,
atty.

UNITED STATES PATENT OFFICE.

GEORGE E. MASON, OF BALTIMORE, MARYLAND.

TENT.

SPECIFICATION forming part of Letters Patent No. 620,600, dated March 7, 1899.

Application filed August 15, 1898. Serial No. 688,573. (No model.)

*To all whom it may concern:*

Be it known that I, GEORGE E. MASON, of the city of Baltimore, State of Maryland, have invented certain Improvements in Tents, of which the following is a specification.

In the description of the said invention which follows reference is made to the accompanying drawings, forming a part hereof, and in which—

Figure 1 is a vertical section of the improved tent. Fig. 2 is a top view. Figs. 3, 4, 5, 6, and 7 are enlarged views of details of the tent, and hereinafter described.

Referring now to the drawings, A is a box of rectangular cross-section, with its lower end planted firmly in the ground.

B is the tent-pole, with its lower portion, which is rectangular in cross-section, inserted in the box, as shown particularly in Figs. 5 and 6, the former being a vertical section and the latter a cross-section of the box and pole. The inner face of the lower portion of the tent-pole is provided with a rack, the teeth $a$ of which are in gear with similar teeth $b$ of a pinion C, situated within the box A, as shown in Figs. 5 and 6. The shaft D of the pinion C extends entirely through the sides of the box A and is supported by them and at one end is provided with a winding-crank F and at the other with a ratchet-wheel G.

H is a pawl hinged or pivoted to the side of the box A, with its end resting on the teeth of the ratchet-wheel, as shown in Fig. 6.

The upper part of the tent-pole is cylindrical and near to its top is fitted with a tight collar I, having, say, eight pairs of lugs $f$, and to each pair is hinged an arm J after the manner of the ribs of an umbrella. A loose collar K (see Figs. 3 and 7, which are respectively a top and a central cross-section of the collar on the pole) has lugs $g$, similar in construction and arrangement to the ones $f$ on the fixed collar, and to these are united the bars L, whereby the arms J are extended or drawn in toward the tent-pole. By lowering the loose collar K the arms are brought down, and by raising it the arms are extended, as shown in Fig. 1. The means whereby the said loose collar is operated or raised and lowered consist of cords $h$, one end of each being attached to the said collar, as shown in Fig. 7. The cords are carried over pulleys M, attached to eyes $j$, which project from the pole immediately under the tight collar I, and then brought down so as to admit of their being connected to cleats $k$ on the rectangular portion of the pole.

N is a cover of some light material, such as duck, similar to the cover of an umbrella, fastened to the pole and to the arms where over the ends of the latter it projects, as shown in Fig. 1.

O is an octagonal extension of the cover, of such length that when the cover is in its highest position its lower edge will be near the ground, as shown in Fig. 1. The extension of the cover is slit, as shown in Fig. 1, to provide an entrance to the tent.

To give the tent stability, the end of every other arm J is provided with a cord $m$, which is fastened to a tent-peg $n$, driven in the ground, as shown in Fig. 1. After the cords $m$ are connected to the tent-pegs they may be tightened by slightly raising the arms and pole through the medium of the rack-and-pinion mechanism described, the ratchet-wheel and pawl preventing the return or lowering of the pole and its attachments.

During severe rain-storms the tent can be lowered until the extension of the cover touches the ground.

I claim as my invention—

1. In a tent, the combination of a central pole having at one side thereof a toothed rack, a box adapted for insertion in the ground into which the lower end of the pole is placed, a pinion situated within the box with its teeth in gear with those of the rack, a shaft to which the pinion is fastened which extends entirely through the box and is provided with a crank-handle for raising the pole, and a ratchet-and-pawl mechanism whereby the pole when raised is supported, substantially as specified.

2. In a tent, the combination of a central pole having a toothed rack at one side thereof, a box adapted for insertion in the ground into which the lower end of the pole is placed, a pinion situated in the box with its teeth in gear with those of the rack, a shaft to which the pinion is fastened which extends through both sides of the box, a winding-crank handle at one end of the shaft, and a ratchet-wheel at the other, a pawl pivoted to the box with its end resting on and adapted to engage with the teeth of the ratchet-wheel, extensible arms springing from a collar at the upper end of the pole, a sliding collar on the pole with rods which pivotally connect it with the arms, cords whereby the sliding collar with its attachments may be raised to extend the arms, a cover situated over the arms having a hanging extension, and cords which connect certain of the arms to pegs in the ground whereby the tent is held securely in place, substantially as specified.

GEORGE E. MASON.

Witnesses:
WM. T. HOWARD,
GEO. E. TAYLOR.